(12) United States Patent
Fuke et al.

(10) Patent No.: US 9,658,697 B2
(45) Date of Patent: May 23, 2017

(54) ACTIVE ELEMENT DISPLAY REORIENTATION METHOD AND DEVICE

(71) Applicant: PartyGaming IA Limited, Hamilton (BM)

(72) Inventors: David Christopher Fuke, Gibraltar (GI); Petra Wagner, London (GB); Romashkan Andrii Valeriyovych, Vinnytsya (UA); Manuela Jaglitsch, Vienna (AT)

(73) Assignee: PartyGaming IA Limited, Hamilton (BM)

( * ) Notice: Subject to any disclaimer, the term of this patent is extended or adjusted under 35 U.S.C. 154(b) by 0 days.

(21) Appl. No.: 14/498,919

(22) Filed: Sep. 26, 2014

(65) Prior Publication Data

US 2016/0091974 A1    Mar. 31, 2016

(51) Int. Cl.
*G06F 3/01* (2006.01)
*G06F 3/0484* (2013.01)
(Continued)

(52) U.S. Cl.
CPC .......... *G06F 3/017* (2013.01); *G06F 3/04817* (2013.01); *G06F 3/04845* (2013.01);
(Continued)

(58) Field of Classification Search
CPC .. G06F 3/017; G06F 3/04845; G06F 3/04817; G06F 2200/1614; G06F 2203/04802; G07F 17/3211
(Continued)

(56) References Cited

U.S. PATENT DOCUMENTS 6,165,070 A * 12/2000 Nolte ............... G07F 17/34
273/143 R
2007/0174782 A1   7/2007 Russo
(Continued)

FOREIGN PATENT DOCUMENTS

EP    2615524 A1    7/2013

OTHER PUBLICATIONS

International Search Report mailed Nov. 10, 2015, issued in International Application PCT/EP2015/067998 (5 pages).
(Continued)

*Primary Examiner* — Andrew Sasinowski
*Assistant Examiner* — Chineyere Wills-Burns
(74) *Attorney, Agent, or Firm* — Beem Patent Law Firm

(57) ABSTRACT

A method of repositioning of screen elements from a first orientation to a second orientation with rendering one or more active screen elements on the display area in the first orientation. In one embodiment, upon detection to a second orientation, the active screen elements are re-rendered on the display area to be displayed in the new orientation while the direction of movement of animation remains in the same direction relative to the display area. In another embodiment, the method may consist of maintaining a list of screen elements and a list of graphical features including a directionality indicator where the directionality indicator points in a first direction in a first orientation and the same first direction in a second orientation. Re-rendering may be accomplished using a subset of HTML5 and a subset of CSS3 or its successors without having to use code native to the device containing the display area.

20 Claims, 8 Drawing Sheets

(51) Int. Cl.
*G06F 3/0481* (2013.01)
*G07F 17/32* (2006.01)

(52) U.S. Cl.
CPC .............. *G06F 2200/1614* (2013.01); *G06F 2203/04802* (2013.01); *G07F 17/3211* (2013.01)

(58) Field of Classification Search
USPC ........................................................ 345/156
See application file for complete search history.

(56) References Cited

U.S. PATENT DOCUMENTS

| | | | |
|---|---|---|---|
| 2008/0095470 A1* | 4/2008 | Chao | G06T 3/0012 382/298 |
| 2008/0234032 A1 | 9/2008 | Brunet de Courssou et al. | |
| 2009/0131148 A1* | 5/2009 | Loose | G07F 17/3202 463/20 |
| 2012/0086728 A1* | 4/2012 | McArdle | G06F 3/017 345/633 |
| 2012/0133677 A1* | 5/2012 | Suzuki | G06F 1/1694 345/649 |
| 2012/0200600 A1* | 8/2012 | Demaine | A63F 13/10 345/633 |
| 2012/0324400 A1* | 12/2012 | Caliendo, Jr. | G06F 9/4443 715/835 |
| 2013/0021377 A1* | 1/2013 | Doll | G09G 5/14 345/649 |
| 2014/0066162 A1* | 3/2014 | Basallo | G07F 17/326 463/18 |

OTHER PUBLICATIONS

Anonymous, Home screen auto rotate—Android Forums at AndroidCentral.com, dated Sep. 21, 2013, last accessed Oct. 30, 2015, http://forums.androidcentral.com/motorola-droid-maxx/316607-home-screen-auto-rotate.html.

* cited by examiner

ACTIVE ELEMENT DISPLAY REORIENTATION METHOD AND DEVICE

BACKGROUND OF THE INVENTION

1. Field of the Invention

The present invention relates generally to a method and system designed to reorient elements on a display.

2. Background of the Invention

Displays capable of re-orientation of the display may need the ability to re-orient elements shown on a display. This can be accomplished using application code resident on the device that has a display to re-draw the elements in the new orientation. The code may need to be specific to the device and resolution of the display. The elements may change in size to fit in the new orientation. Parts of the display may no longer be used after a change of orientation.

Games, including games with reels such as Slots games, played on devices, especially mobile devices like smartphones and tablets, may use a horizontal format with the width of the slot game being longer than the height; In the example of a slot game, this is mostly because of the "reels" which spin vertically to show the game symbols. If the orientation of the screen is changed to the vertical it requires shrinking of the game screen significantly, in particular the reels, to fit on the reduced screen width. This makes the game-play harder to follow due to the reduced symbol size and cluttered due to the large amount of information displayed. This can have a negative impact on the user experience.

A need exists in the art for a system capable of re-orientation of a display containing elements that addresses the above.

BRIEF SUMMARY OF INVENTION

A need exists in the art for a system capable of showing active elements of a user interface in multiple orientations. The system may work on different devices and platforms on displays with different resolutions. The system may provide re-rendering of elements in different orientations without interrupting the action of any active interface elements. The system may not require the active elements to be stopped or the screen blacked out. The system may be autonomous and continue to support the rendering of active elements of the system even in instances where there is no communication link with a central system.

In an embodiment that comprises a slot machine type game with reels, the reels may use the entire available display screen to display and animate the reels. When the display device is rotated vertically, the reel symbols are rotated to be displayed vertically so the user can view the symbols without the need to turn his/her head. The game information display may also be displayed vertically. When displayed vertically, the reel spin animation occurs horizontally with the win lines running vertically. The system may monitor the status of screen elements. The system may comprise a set of user interface display elements, each of which is independently managed and rendered.

The system may re-render user interface elements on the basis of one or more objective criteria. Each user interface element may be independently addressable by the system and drawn as needed.

The system may detect the orientation of display areas for user interface elements. Each user interface element may be tracked on a display area and the orientation of the display area may be tracked. The arrangement of each display element may be maintained in relation to the physical display orientation.

The system may detect a change in orientation. Each display area may be assigned a means to detect changes in orientation. The system may facilitate knowledge of orientation of the display areas and detect changes of same.

The system may re-render interface elements within a display area to display same in accordance with the orientation of a given display area. The interface element may be rendered in the expected orientation of a display area. The display area interface elements may always be rendered in the physical orientation which corresponds to the physical orientation of the display area.

The system may re-render the user interface elements without interrupting the action of the interface elements. The interface elements may contain one or more active features and the active features continue playing during the reorientation and redrawing system. The redrawn active elements may continue their activity during the transition period and following re-rendering.

The system display elements may maintain relationships with one another following re-rendering. Each element may retain its relative position with other elements following re-rendering in a changed orientation. The system may have each element retain its relative position following a re-rendering step.

The system may allow for re-rendering of user interface elements on any client platform. The system may be comprised of standards-compliant programming components. The system may contain a rendering engine capable of understanding the standards-compliant programming components.

The system may provide a display system which is scalable to many concurrent users. The programming elements of the system may perform the rendering tasks using local resources, even in systems that have limited graphics capability. The system may be capable of being installed in any compatible program or device regardless of the underlying hardware or software system in place. The system may be capable of being used where there is no connection to a central server, such as when the end user lacks an internet connection or is using the system on a device which does not have constant internet connection. In some other embodiments, the graphic elements may be downloaded as needed from a server or other computing device over a network.

The system may be configured to facilitate the prolonged use of the system software. The system components may allow the user to change orientation of the display to address fatigue or glare without stopping active elements shown on the display. The system therefore may allow the end user to continue using the system for long periods of time.

An embodiment may be a method of repositioning of screen elements from a first orientation to a second orientation with rendering one or more active screen elements on the display area in the first orientation. The display area has a width and a height and contains one or more active screen elements. Upon detection of a change to a second orientation, the active screen elements are re-rendered on the display area to be displayed in the new orientation while the direction of movement of animation remains in the same direction relative to the display area. The second orientation also has a display area with a height and a width.

BRIEF DESCRIPTION OF DRAWINGS

The invention together with the above and other objects and advantages will be best understood from the following detailed description of the preferred embodiment of the invention shown in the accompanying drawings, wherein.

DETAILED DESCRIPTION OF THE ILLUSTRATED EMBODIMENT(S)

Figure 1:
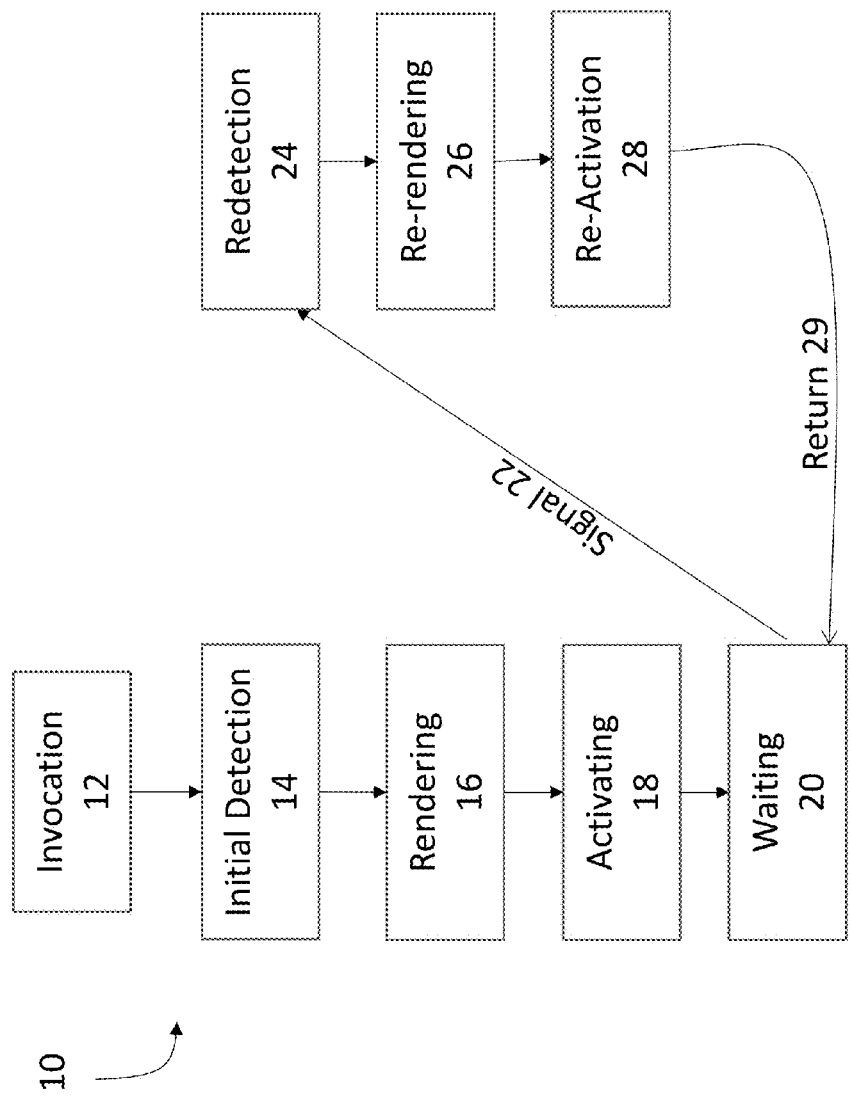
FIG. 1 depicts a schematic overview of one embodiment of the system.

The foregoing summary, as well as the following detailed description of certain embodiments of the present invention, will be better understood when read in conjunction with the appended drawings.

To the extent that the figures illustrate diagrams of the functional blocks of various embodiments, the functional blocks are not necessarily indicative of the division between hardware circuitry. Thus, for example, one or more of the functional blocks (e.g. processors or memories) may be implemented in a single piece of hardware (e.g. a general purpose signal processor or a block of random access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Turning first to FIG. 1, depicted therein is a schematic overview of one embodiment of the invention. The invention comprises a system 10, implemented using a subset of standards-compliant software, designed to detect and optimize a display of one or more user elements.

The system 10 begins when underlying software is invoked 12. In one embodiment, the underlying software comprises an application which includes the system 10 functions. In another embodiment, the system 10 functions are implemented in a website and the system invocation 12 occurs when a web browser visits a website address of a page implementing the system 10. In yet another embodiment, the system 10 is implemented directly in an operating system and so the invocation 12 occurs automatically at system startup.

Following the invocation 12 of the system, the system 10 detects the display area as part of the detection step 14. During the detection step 14, the system 10 records information about the available space within in the display area, including the dimensions of the display area. In embodiments using two-dimensional displays, the display area comprises a polygon, with a rectangle being the most common shape. In one embodiment, the display area includes an indication of which boundary of the display area corresponds to the physical top of the device showing the display area. In such an embodiment, the information regarding the display area includes an indication of the top direction or boundary. In embodiments where there is no dedicated indication of the top direction, the system 10 selects one direction as the top direction.

In other embodiments, the system 10 is adapted for use with three-dimensional displays. In such displays, the display area includes an indication of the boundary indicating the top of the device as viewed by the user. Other embodiments including adaptations for bendable or foldable displays with an indication of the top of the device as best viewed by the user. In such three-dimensional embodiments where there is no dedicated indication of the top direction, the system 10 selects one direction as the top direction.

The system 10 maintains the information about the relative orientation of each boundary of the display area, specifically the relative orientation of each boundary to the designated top boundary or top direction.

Upon detection in the detection step 14 of the display area, the system 10 proceeds to the rendering step 16. During the rendering step 16, the system draws within the display area one or more display elements. In one embodiment, the display elements are sensitive to the orientation of the display. In this embodiment, each display element includes a top boundary for the element. During rendering, the top boundary of the display area corresponds to the top boundary of each element. The result of the rendering step 16 is that all elements shown on the display are oriented towards the top of the display area. In one embodiment, the elements are already present in computer storage present in the system 10. In another embodiment, the elements are downloaded over a network during the invocation 12. In yet another embodiment, the elements are downloaded during the rendering step 16.

Following the rendering step 16, the elements are activated in activating step 18. At the activating step 18, each element begins its determined active behavior. In one embodiment, the active behavior comprises spinning or other animation of each element. The activating step 18 ensures that active actions occur while nonetheless accounting for the relative orientation of display area boundaries.

Concurrently with the activating step 18 for the active elements, the system 10 enters into a state of active waiting 20 waiting for the change of orientation signal. In one embodiment, the change of orientation signal comprises an interrupt from a hardware detector, such as an accelerometer. In another embodiment, the signal comprises a user action, such as the user activating a command button or if the user re-sizes the display area. In another embodiment, there is no need for active waiting as the change of orientation signal is a browser trigger event from the internet browser running on the device. The browser trigger event may be a resize page event from a standard browser event handler.

If a change of orientation signal 22 is detected or received, the system proceeds to re-detect the display area as part of the redetection step 24. The information about the previously selected top boundary is referenced and a determination is made as to the orientation of the reoriented display area.

In one embodiment, the change of orientation signal 22 issues when a rectangular display area has been physically rotated by 90 degrees such that the previous top boundary has become the right boundary.

Following the redetection of the display area, the system proceeds to the re-rendering step 26 to re-render the interface elements. In one embodiment, each interface element has a graphic for use in each respective orientation with a rapid re-rendering from one graphic to the other after re-orientation. In another embodiment, the re-rendering step 26 comprises a transition graphic which maintains the appearance of the active element during the transition. For example, in one embodiment, following the activating step 18, elements are actively spinning in one orientation. In this embodiment, as part of the re-rendering step 26, the spinning elements continue to spin during the transition from the initial orientation to the redetected orientation with the spinning tilting in the direction of the new orientation.

Once the elements are re-rendered, each element is reactivated as part of the reactivation step 28. The reactivation also ensures that the elements active behavior accounts for the top boundary of the new display area as redetected in the previous step, redetection step 24.

Following reactivation, the system returns 29 to active waiting 20 until a new signal to re-orient the display area has been received as a change of orientation signal 22.

In one embodiment, following the reactivation step 28, the system 10 enters into a low energy state where it does not maintain the status of any of the display area features or any of the interface elements. Instead, the system 10 waits for the next signal before evaluating any part of the system. An advantage of this approach is that the system does not tie up any resources unless a change signal has been issued.

Figure 2:
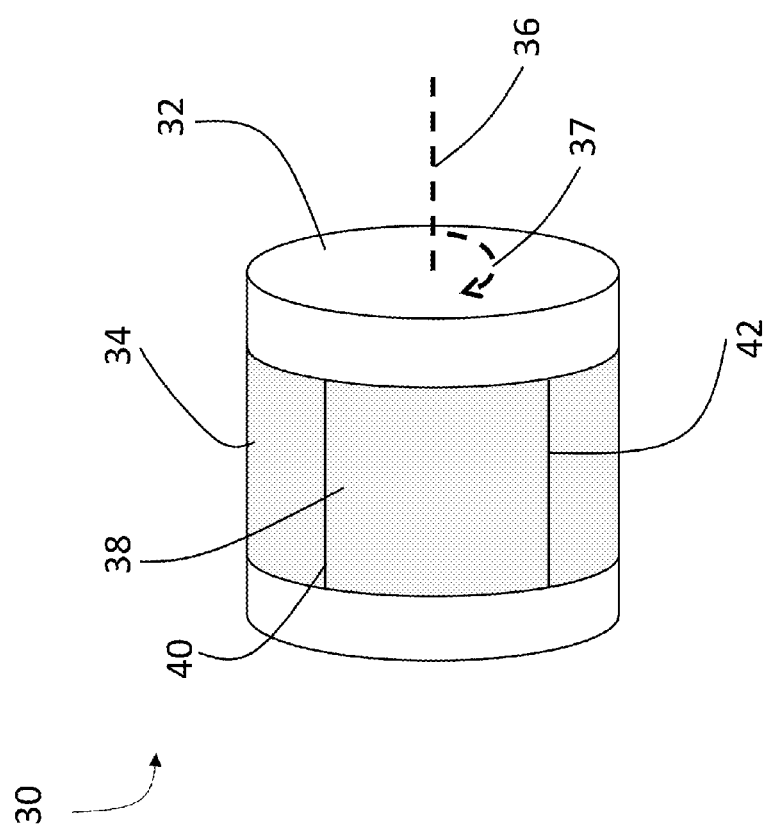
FIG. 2 depicts a schematic overview of one active element pursuant to an embodiment of the system.

Turning to FIG. 2, depicted therein is an example of an active user interface element 30, in one embodiment. Per the embodiment shown in FIG. 2, the interface element 30 comprises a cylindrical shaped body 32 with one or more subsections 34 shown on the body 32. In one embodiment, the subsections 34 comprise images rotating around the cylindrical shaped body 32. The cylindrical shaped body 32 rotates along an axis 36, in the direction shown by arrow 37.

In the embodiment shown in FIG. 2, the visible subsections 34 comprise an image 38 with a top boundary 40 and a bottom boundary 42. The image 38 rotates along with the body axis 36. The image 38 is considered to be rotating in agreement with its orientation whenever the top boundary 40 leaves the visible area of the cylindrical shaped body 32 at a time prior to the bottom boundary 42 leaving the visible area of the cylindrical shaped body 32. During the re-rendering step 26 discussed above and shown in FIG. 1, the system ensures that the rotation occurs in agreement throughout the operation of the system.

The cylindrical shaped body 32 spins in three steps around axis 36, in one embodiment. First, the cylindrical shaped body 32 begins by accelerating in its direction of movement. Second, the cylindrical shaped body 32 accelerates to a normal rate of spinning, and finally it decelerates to a stopped configuration. As implemented, the cylindrical shaped body is shown using animation employing 30 frames per minute, with approximately five seconds required for the rotation process to complete.

Figure 3B:
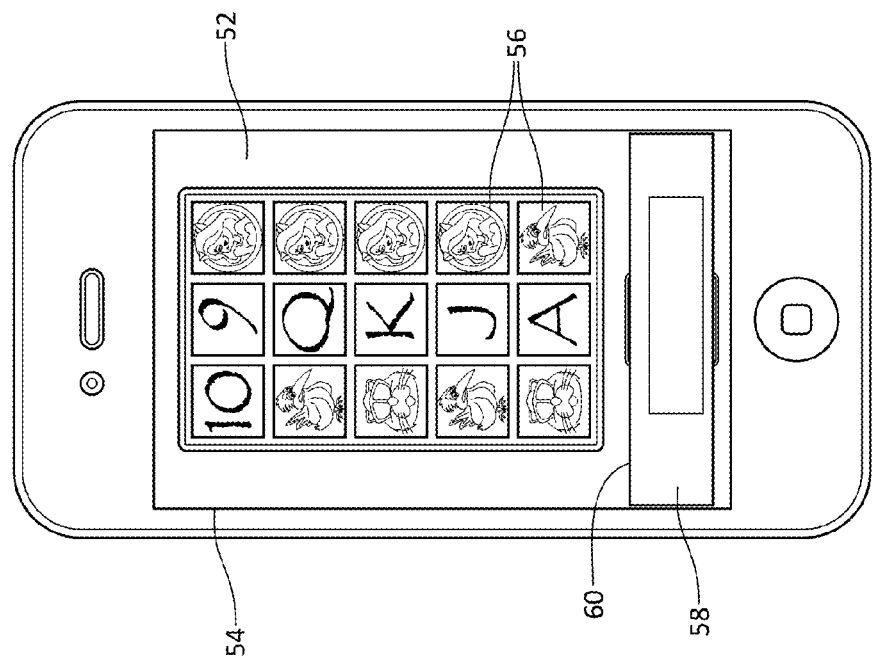
FIG. 3B depicts an overview of one user interface in a second orientation pursuant to one embodiment of the system.
Figure 3A:
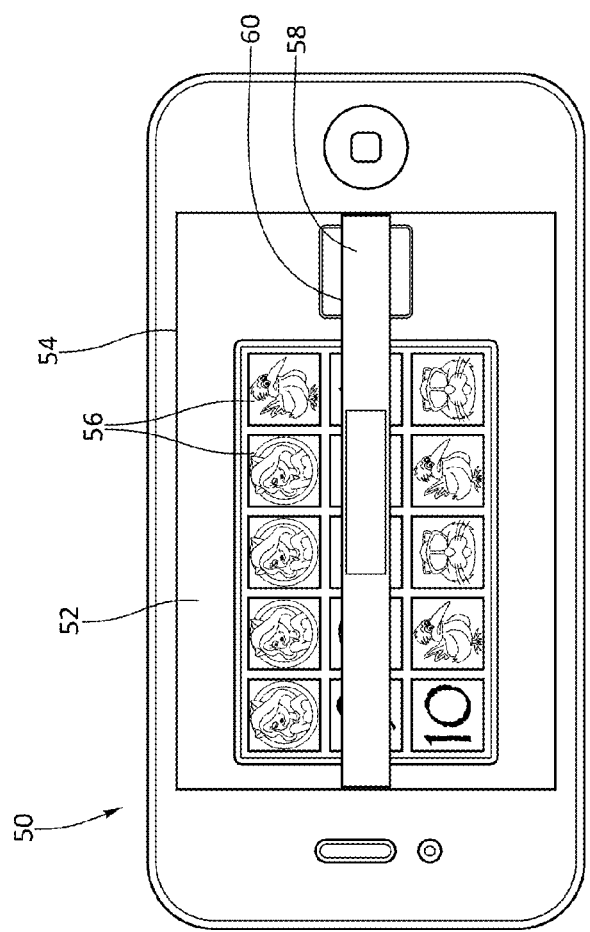
FIG. 3A depicts an overview of one user interface in a first orientation pursuant to one embodiment of the system.

Turning to FIGS. 3A and 3B, depicted therein are examples of embodiments of the system as depicted within an application comprising rotating active user interface elements. The system detects that it is running within a mobile device 50 having a display area 52. The display area 52 has a designated top boundary 54, in either orientation. Active elements 56 are maintained in an orientation that is in agreement with the top boundary 54 of the display area 52. Further, one or more passive elements, such as the text field 58, is also transitioned to an orientation wherein the passive element top boundary 60 remains in agreement with the top boundary 54 of the display area 52.

In FIGS. 3A and 3B, beyond maintaining the orientation of active elements 56 in reference to the display area 52, the spatial relationships between the active elements 56 are maintained and translated from the orientation of FIG. 3A to FIG. 3B. The re-arrangement of active elements will be discussed below, along with a discussion of FIGS. 5A and 5B.

As can be seen in the embodiment shown in FIGS. 3A and 3B, the arrangement of the active elements 56 does not need to correspond to their location in the previous orientation. As such, the active elements 56 which are closest to the top boundary 54 in the first orientation do not have to be closest to the top in the second configuration shown in FIG. 3B. Instead, the issue of concern in the embodiment shown in these two figures is that the elements remain in the correct orientation—that the active elements are not depicted upside down or in an order which is unrelated to their earlier order.

Figure 4:
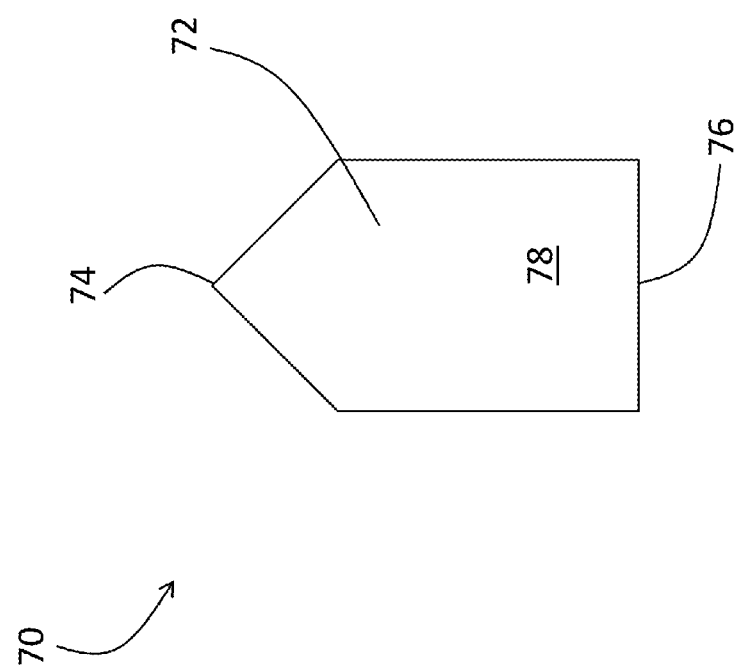
FIG. 4 depicts another embodiment of an active user element pursuant to an embodiment of the system.

FIG. 4 depicts another embodiment 70 of an active user interface element 72. The active element comprises a shape having a polygonal top surface 74 and a bottom surface 76 comprising a single line. The active user interface element 72 includes an ability to change a background color 78. However, when displayed on a user interface, the active user interface element 72 should be aligned such that the polygonal top surface 74 points in the direction of the top boundary of the display area having said active user interface element 72.

The embodiment shown in FIG. 4 can be used as a game piece within a board game or other directionality indicator. Even when the background board game is rotated, as occurs when a physical device is shared between multiple people, the polygonal top e interface element 72.

Figure 5B:
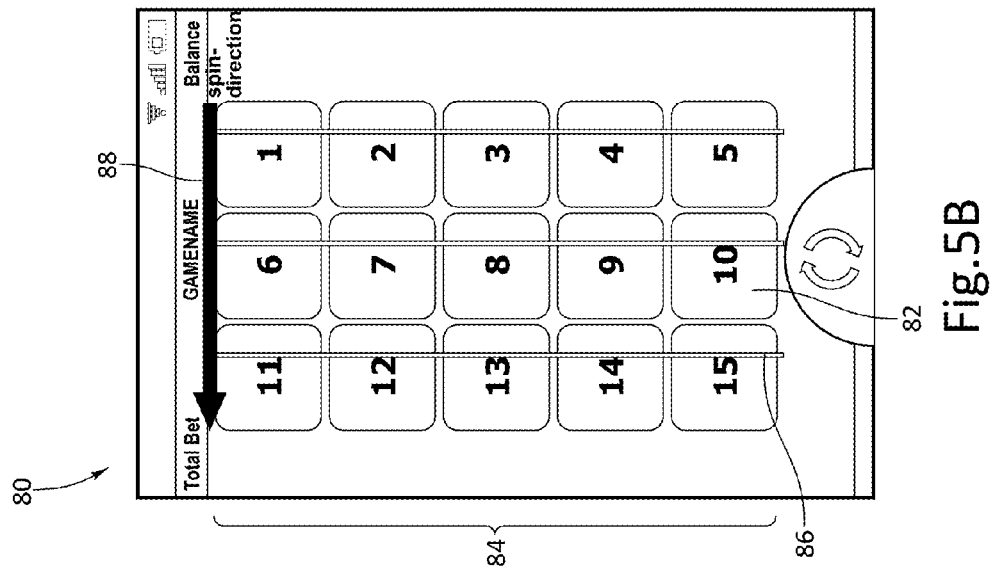
FIGS. 5A and 5B depict an overview of the re-arrangement of user elements pursuant to an embodiment of the system.
Figure 5A:
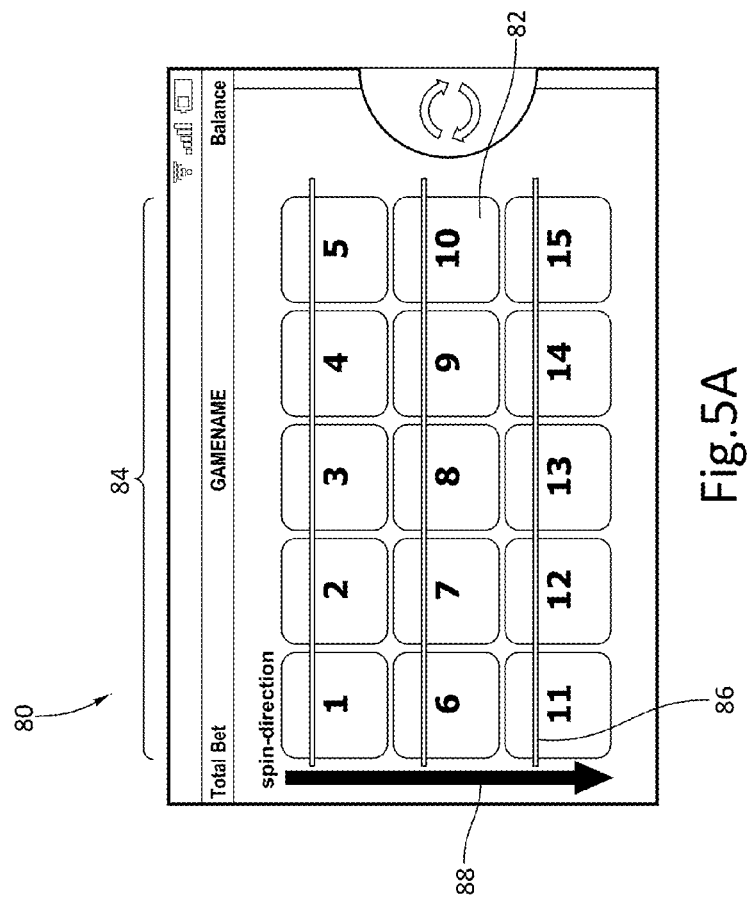

As shown in FIGS. 5A and 5B in one embodiment 80, the active elements 82 comprise a matrix 84. In the 'landscape' orientation of FIG. 5A, the matrix 84 comprises three rows 86, shown as three lines. Each of the active elements 82 comprises a rotating element with the rotation direction shown depicted using arrow 88.

Following the reconfiguration shown in FIG. 5B, each of the rows 86 has become one of columns 96. The spatial relationship between the active elements 82 has been maintained. For example, in FIG. 5A, the element '10' was shown as being surrounded by elements '16', '15,' '9,' '4,' and '5' (moving in a clockwise direction from the bottom). In FIG. 5B, the element '10' is likewise surrounded by elements '16', '15,' '9,' '4,' and '5' again when moving in a clockwise direction from the bottom.

As such, the lines of active elements 82 which started out as rows 86 are maintained following the reorientation, except that the elements have become columns 96.

Implementation

One of the objects of the system is to create an animation and rotation system which does not rely on client-side pre-rendered graphical elements. Instead, the system uses a subset of standard programming interfaces to accomplish the re-rendering of active user elements as part of re-rendering step 26 discussed in FIG. 1 above.

Figure 6:
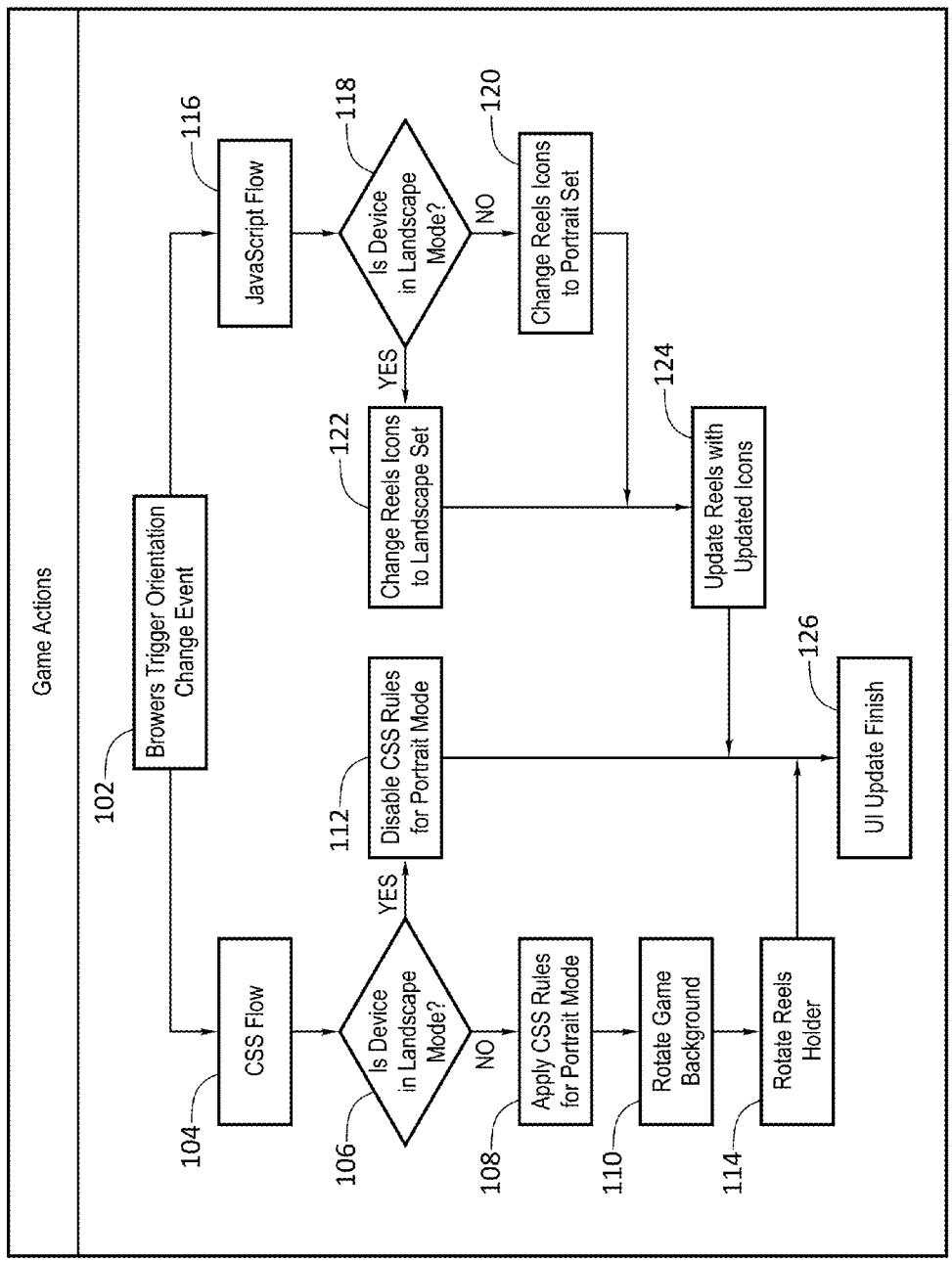
FIG. 6 depicts a flow chart for triggered rotation flow for CSS and JavaScript.

Turning to FIG. 6, a flowchart 100 is depicted showing in one embodiment using rotating reels, the rotation and re-rendering procedure using Cascading Style Sheets ("CSS") and JavaScript for a switch from landscape mode to portrait mode. The procedure starts with a triggering event 102. The triggering event 102 can originate in a physical device such as a sensor or button, through a software procedure that generates a signal, or other signaling means known in the art.

After the triggering event 102, the CSS flow 104 on the left side of the figure detects if the device being used is in landscape mode in the CSS landscape mode detection step 106. If the result of the CSS landscape mode detection step 106 is 'NO', then CSS rules are applied for portrait mode 108, the game background is rotated in the rotate background step 110, the reels holder is rotated in the rotate reel step 114 and then the user interface update is finished in the UI update finish step 126. If the result of the CSS landscape mode detection step 106 is 'YES', then CSS rules for portrait mode are disabled in the disable CSS rules for portrait mode step 112 and then the user interface update is finished in the UI update finish step 126.

The JavaScript flow 116 on the right side of FIG. 6 detects if the device being used is in landscape mode in the JavaScript mode detection step 118. If the result of the JavaScript mode detection step 118 is 'NO', then the reels icons are changed to the portrait set in the change icons to portrait step 120. The reels are then updated with the portrait icons in the update reels step 124 and then the user interface update is finished in the UI update finish step 126. If the result of the JavaScript mode detection step 118 is 'YES', then the reels icons are changed to the landscape set in the change icons to landscape step 122. The reels are then updated with the landscape icons in the update reels step 124 and then the user interface update is finished in the UI update finish step 126.

Figure 7:
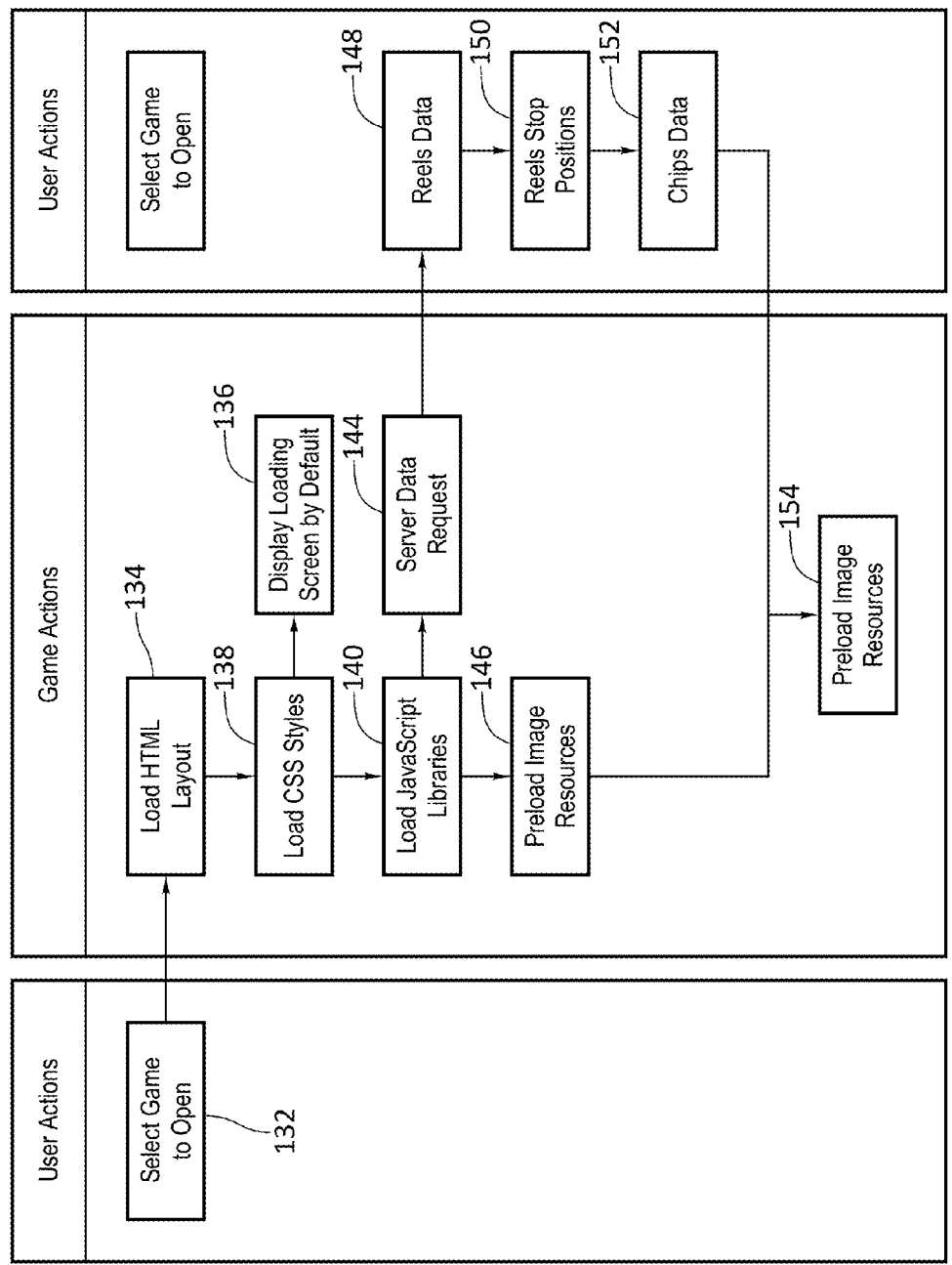
FIG. 7 depicts client/server interaction for one embodiment of the system.

FIG. 7 shows the processes that happen when a user requests a game in the embodiment that uses HTML and CSS function calls. The figure shows user, client computer, and game server interactions 130 of the embodiment. In this one embodiment, these may be HTML5 and CCS3 function calls or their successors. The user action in this figure is the game selecting step 132 where the user selects a game to open. The actions performed by the game start with loading of the HTML layout in the Load HTML layout step 135. Next the game loads a loading screen 135 along with loading the CSS styles in the Load CSS styles step 138. Next, the game loads the JavaScript libraries 140 and preloads Image resources 146. While the Preload Image resources step 146 is loading, a request is sent to the server in the Server data Request step 144.

Figure 8:
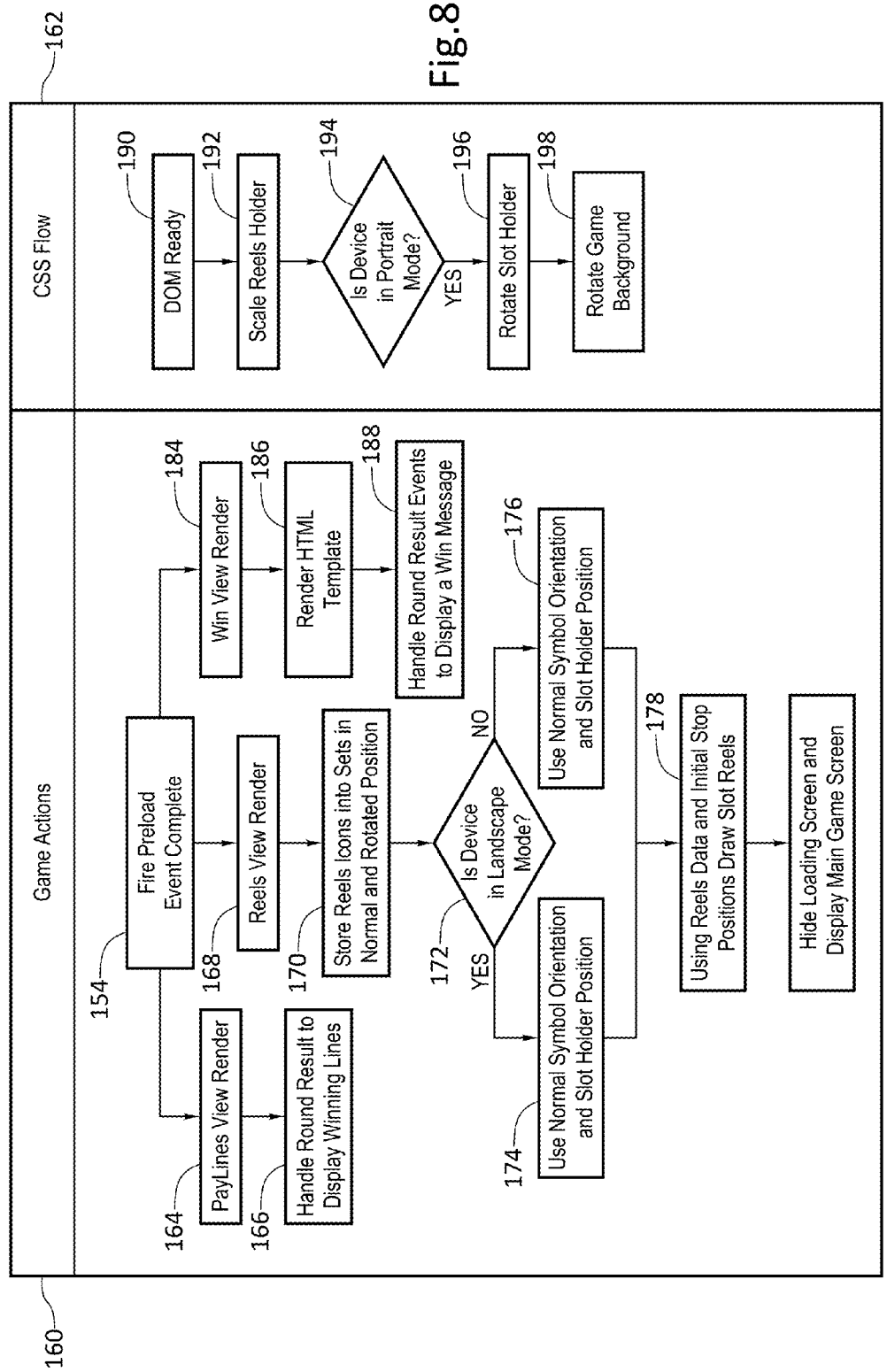
FIG. 8 depicts JavaScript and CSS flow following the client/server interaction.

The server performs the following actions following the Server data Request step 144: supplies Reels Data 148, Reels Stop Positions 150 and Chips Data 152 to the game. After the server supplies these items and the Preload Image resources step 146 is complete, the Fire Preload Event complete step 154 is completed. and FIG. 8. shows the JavaScript Flow 132 and the CSS Flow 134 after the Fire Preload Event complete step 154 in FIG. 7 in one embodiment in the context of a game using reels that can line up in potentially winning lines.

After Fire Preload Event complete step 154, the JavaScript Flow 160 performs the Paylines View rendering step 164 to visually display the paylines. Then, after the game round finishes, displays the winning lines in the Handle Round Result step 166.

Concurrently, the JavaScript Flow 160 renders the Reels View in the Reels View rending step 168 to visually display the reels. This consists of Store Sets step 170 to store the reels icons into sets in both the normal and rotated position and a landscape determination step 172 to determine if the display mode is landscape mode. If the device is in landscape mode, the normal symbol orientation and slot holder position is used 174 in this embodiment. If the device is in portrait mode, the rotated symbol orientation and slot holder position is used 176 in this embodiment. Then the Reels Data 148 and the Reels Stop Positions 150 in FIG. 7 are used to draw the Slot Reels in the Draw Slot Reels step 178. Concurrently, the JavaScript Flow 160 renders the VWin View in the Win View Render step 184. Next, the HTML template is rendered in the Render HTML template step 186. Finally, a win message is potentially displayed based on the round result event in the Display a win message step 188. Concurrently, in the CSS Flow 162, if the Document Object Model 190 is ready, the Reels Holder is scaled in Scale Reels Holder step 192. A determination 194 is made if the device is in portrait mode. If the device is in portrait mode, the slot holder is rotated in the Rotate Slot Holder step 196. Finally the Game background is rotated in the Rotate Game Background step 198 if in portrait mode.

Example CSS code applying rotation is as follows:

```
@media only screen and (max-aspect-ratio: 4 / 3) { /* code here */ }
··· this rule is to define portrait
    mode and apply rotation for reels holder
    #appWrapper:before {
        -webkit-transform: rotate(90deg);
        -moz-transform: rotate(90deg);
        -ms-transform: rotate(90deg);
        -o-transform: rotate(90deg);
        transform: rotate(90deg);
    }
```

This rule is applied to rotate reels holder.
Example JavaScript code is as follows:

```
In JavaScript there is a code which is trigged by changing orientation
and switch the symbols set:
    setBaseSymbols: function( ){
        var current;
        if($.screenSizeFixer.getOrientation( ) == this.LANDSCAPE){
            current = this.landscapeSymbols
        }
        else {
            current = this.portraitSymbols;
        }
        this.currentSymbols = current;
        this.redrawSlot( );
    }
```

In scope of animation by each frame rendering, there is a method called each time drawn and we can see that for drawing there is a used current Symbols mapping which contain bitmap data:

```
function ReelSymbol(image, id, posX, posY){
    this.imageID = image;
    this.id = id;
    this.positionX = posX;
    this.positionY = posY;
    this.draw = function( ){
        self.ctx.putimageData(self.currentSymbols[" " + thisimageID + "
"].
```

-continued

```
        image, this.positionX, this.positionY);
    }
}
```

While the foregoing written description enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiments and methods, but by all embodiments and methods within the scope and spirit of the invention as claimed.

What is claimed is:

1. A method of repositioning of screen elements from a first orientation to a second orientation, the method comprising:
    detecting a first orientation, wherein said first orientation comprises a display area having a first height and a first width;
    rendering a first set of active screen elements on the display area in the first orientation, each of said active screen elements of the first set depicting an object that moves through multiple positions on the display area;
    rendering a background image in the first orientation;
    detecting a change to a second orientation, wherein said second orientation comprises the displaying area having a second height and a second width;
    rendering one or more active screen elements of a second set of elements on the display area in the second orientation, each of said active screen elements of the second set depicting an object that moves through multiple positions on the display area and associated with a corresponding active elements of the first set; and
    re-rendering the background image in the second orientation.

2. The method of claim 1 wherein said second width is equivalent to the first height and the second height is equivalent to the first width.

3. The method of claim 1 wherein said active screen elements comprise a matrix of moving elements.

4. The method of claim 3 wherein said moving active screen elements comprise spinning elements.

5. The method of claim 1 wherein said detection of a change occurs due to a signal from an accelerometer.

6. The method of claim 1 wherein said detection of a change occurs due to a resizing of the display area.

7. The method of claim 1 wherein said detection of a change occurs due to input from a user.

8. The method of claim 1 wherein said first orientation is a portrait orientation and said second orientation is a landscape orientation.

9. The method of claim 1 wherein said active elements comprise at least one face and wherein said re-rendering to a second orientation rotates said at least one face.

10. The method of claim 1 further comprising static screen elements wherein said static screen elements are re-rendered in the second orientation.

11. The method of claim 1 wherein said display area includes a background with said active elements shown in front of said background.

12. The method of claim 11 further comprising initially resizing the active elements to minimize the amount of visible background while maintaining a constant aspect ratio for said active elements.

13. The method of claim 1 wherein the re-rendering step uses a subset of HTML5 and a subset of CSS3.

14. A method of redrawing of screen elements, the method comprising:
    maintaining a list of first elements and a list of first graphical features shown on each of said first elements associated with a first orientation wherein said first graphical features include an animation;
    maintaining a list of second elements and a list of second graphical features shown on each of said second elements associated with a second orientation;
    maintaining a background image;
    rendering said first elements, said first graphical features and said background image in a first orientation wherein said-animation is active in the first orientation;
    detecting a change to a second orientation; and
    rendering said second elements, said second graphical features and said background image in the second orientation, wherein said animation remains substantially continuous during a transition from the rendering step through the second rendering step.

15. The method of claim 14 wherein said re-rendering is accomplished using web page definition languages.

16. The method of claim 14 wherein said re-rendering uses a subset of HTML5 and a subset of CSS3.

17. The method of claim 14 wherein said elements comprise rotating cylinders.

18. The method of claim 14 wherein said graphical features comprise pictures.

19. A method of rendering a plurality of graphical elements on a display area, the method comprising:
    detecting a first orientation;
    rendering on the display area the plurality of graphical elements in one or more first rows and one or more first columns;
    rendering a background image in the first orientation;
    detecting a change to a second orientation;
    transitioning the graphical elements from the one or more first rows into one or more second columns and the graphical elements from the one or more first columns into one or more second rows;
    rendering on the display the graphical elements in the one or more second rows and the one or more second columns in the second orientation; and
    rendering the background image in the second orientation;
    where the graphical elements rotate through multiple positions among their respective first row or first column in the first orientation and continue to rotate in the respective second column or second row in the second orientation, the rotation being substantially continuous through the first rendering step, the transitioning step, and the second rendering step.

20. The method of claim 19, where:
    the plurality of graphical elements form a plurality of slot reels.

* * * * *